E. N. JENKINS.
Coffee-Roaster.
No. 228,076.  Patented May 25, 1880.
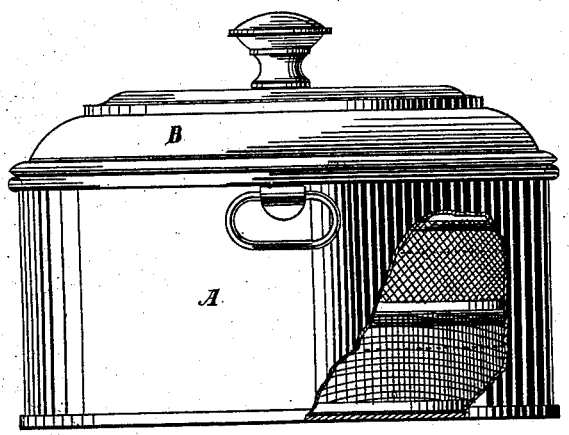
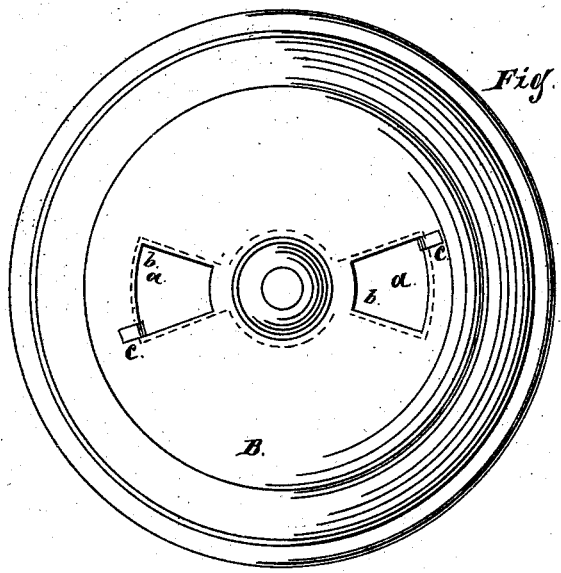
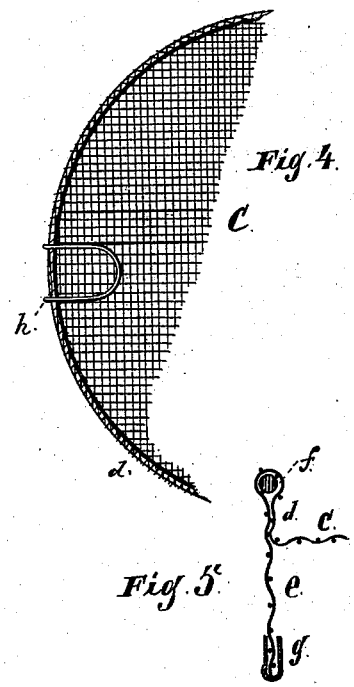
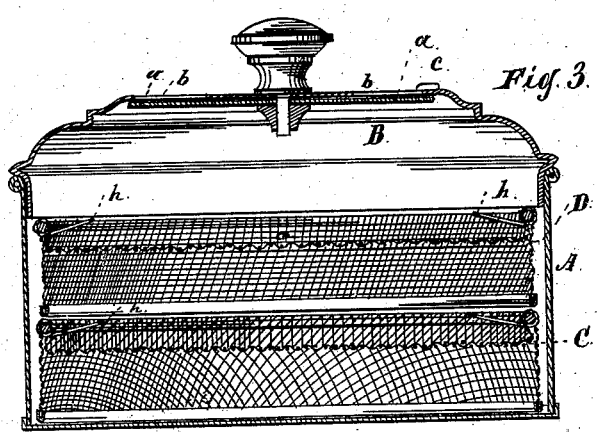
Witnesses:
Inventor:
Eugene N. Jenkins

UNITED STATES PATENT OFFICE.

EUGENE N. JENKINS, OF CHICAGO, ILLINOIS, ASSIGNOR TO JASPER N. RUSSELL, OF SAME PLACE.

COFFEE-ROASTER.

SPECIFICATION forming part of Letters Patent No. 228,076, dated May 25, 1880.

Application filed April 15, 1879.

*To all whom it may concern:*

Be it known that I, EUGENE N. JENKINS, of Chicago, Cook county, State of Illinois, have invented a new and useful Improvement in Coffee-Roasters, of which the following is a full description, reference being had to the accompanying drawings, in which—

Figure 1 is an elevation, with side partly broken away. Fig. 2 is a plan or top view. Fig. 3 is a vertical central section. Fig. 4 is a detail, being a plan of one of the disks. Fig. 5 is a detail in section, showing one of the disks with its upturned and downturned edges.

The leading object of my invention is to provide means by the use of which coffee can be well roasted without attention during the process; and it consists in a close vessel, in which are one or more disks of wire-gauze, substantially as hereinafter described.

In the drawings, A represents the body of a receptacle, which may be made of sheet metal or other suitable material, and having a close bottom. B is the cover of the receptacle. *a* is a slide pivoted upon the inside of the cover B, covering, when closed, two holes, *b*, in the top of the cover, and *c* are two lips, one upon each end of the slide *a*, and projecting over the cover, as shown, to aid in holding the slide in contact with the inside of the cover.

C is a disk of woven wire, upon which coffee to be roasted is placed. To prevent the escape of the coffee at the sides the disk is provided with an upturned edge, *d*, forming with the disk a shallow receptacle for the coffee. The disk is also provided with a downturned edge or support, *e*, to keep the disk from the bottom of the receptacle.

As shown, the disk C and upturned and downturned edges *d e* are formed from a single piece of woven wire, strengthened at the top by a wire, *f*, and bound at the bottom with a thin piece of sheet metal, *g*.

*h h* are handles.

D is another disk of woven wire, having an upturned edge and support, the same as before described.

The disks and parts connected therewith are so made that they can be easily inserted in and removed from the receptacle. The lower one rests on the bottom of A, and the upper one rests on the upper edge, *d*, of C. Either one, two, or more of the disks or coffee-holders may be used. I have shown two.

In use, the coffee to be roasted is to be placed on the disks C D, and the receptacle A B, with the coffee therein, is to be placed in an oven, the heat of which should be at a baking temperature, where the coffee will be roasted in from thirty to forty minutes, according to the temperature, without stirring or agitation or other attention.

By this means coffee can be evenly and well roasted without burning, and nearly all the flavor will be retained. The entire berry will be well roasted, and hence it can be more easily ground, and when ground the full strength will be more easily extracted by the use of hot water than when the coffee is hastily and only partially roasted, as is often the case.

For ordinary family use I make the body A about twelve inches in diameter and four inches high, using two disks, on each of which half a pound of coffee can be placed. I recommend wire-cloth having square meshes, five to the inch. The quantity of metal in the disk is so small that it does not materially interfere with the circulation of the air, and but a small portion of the berry comes in contact with the metal, so that the coffee is practically suspended in hot air while roasting.

I have shown a round receptacle and disks; but other forms may be used.

The slide *a* is not an essential part of the roaster. When used, the coffee can be inspected, if desired, without removing the cover while being roasted.

While the coffee is being roasted the conditions are such that under all ordinary circumstances it will not burn, even though it be left in the oven longer than is necessary.

The utensil can be used for other secondary purposes. For example, it can be used as a corn-popper by providing disks of finer wire-gauze. So, by removing the disks, the receptacle A B can be used for cooking or baking meats or other articles.

What I claim as new, and desire to secure by Letters Patent, is as follows:

One or more disks, C, of wire-gauze, having an upturned edge, $d$, and a support, $e$, the whole being made from a single piece of wire-gauze, in combination with a close vessel, A B, substantially as and for the purpose specified.

EUGENE N. JENKINS.

Witnesses:
E. A. WEST,
O. W. BOND.